United States Patent
Kim et al.

(10) Patent No.: US 9,357,142 B2
(45) Date of Patent: May 31, 2016

(54) IMAGE SENSOR AND IMAGE PROCESSING SYSTEM INCLUDING SUBPIXELS HAVING A TRANSFER CIRCUIT, COMPARATOR AND COUNTER FOR OUTPUTTING THE COUNT VALUE AS THE SUBPIXEL SIGNAL

(71) Applicants: Tae Chan Kim, Yongin-si (KR); Min Ho Kim, Seongnam-si (KR); Dong Ki Min, Seoul (KR); Sang Chul Sul, Suwon-si (KR); Tae Seok Oh, Seoul (KR); Kwang Hyun Lee, Seongnam-si (KR); Tae Yon Lee, Seoul (KR); Jung Hoon Jung, Hwaseong-si (KR); Young Gu Jin, Osan-si (KR)

(72) Inventors: Tae Chan Kim, Yongin-si (KR); Min Ho Kim, Seongnam-si (KR); Dong Ki Min, Seoul (KR); Sang Chul Sul, Suwon-si (KR); Tae Seok Oh, Seoul (KR); Kwang Hyun Lee, Seongnam-si (KR); Tae Yon Lee, Seoul (KR); Jung Hoon Jung, Hwaseong-si (KR); Young Gu Jin, Osan-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 180 days.

(21) Appl. No.: 14/051,802

(22) Filed: Oct. 11, 2013

(65) Prior Publication Data

US 2014/0104469 A1  Apr. 17, 2014

Related U.S. Application Data

(60) Provisional application No. 61/713,175, filed on Oct. 12, 2012.

(30) Foreign Application Priority Data

Mar. 13, 2013  (KR) .......................... 10-2013-0026460

(51) Int. Cl.
*H04N 5/335* (2011.01)
*H04N 5/378* (2011.01)

(52) U.S. Cl.
CPC ............... *H04N 5/335* (2013.01); *H04N 5/378* (2013.01)

(58) Field of Classification Search
CPC ........................... H04N 5/3355; H04N 5/347
See application file for complete search history.

(56) References Cited

U.S. PATENT DOCUMENTS

| 7,257,278 | B2 * | 8/2007 | Burks et al. .................... 382/312 |
| 7,696,545 | B2 | 4/2010 | Panicacci |
| 7,777,796 | B2 | 8/2010 | Inoue et al. |
| 7,969,493 | B2 * | 6/2011 | Kok .............................. 348/308 |
| 8,073,321 | B2 | 12/2011 | Furlan |
| 8,174,598 | B2 | 5/2012 | Ebihara |

(Continued)

FOREIGN PATENT DOCUMENTS

| JP | 2007143118 A | 6/2007 |
| JP | 2009049870 A | 3/2009 |

*Primary Examiner* — Gary C Vieaux
(74) *Attorney, Agent, or Firm* — Harness, Dickey & Pierce, P.L.C.

(57) ABSTRACT

An image sensor includes a pixel array and a row driver block. The pixel array includes a plurality of subpixel groups, each including a plurality of subpixels. Each of the plurality of subpixels is configured to generate a subpixel signal corresponding to photocharge accumulated in response to a photon. The row driver block is configured to generate a first control signal to control the subpixels included in each of the plurality of subpixel groups to accumulate the photocharge in parallel from a first time point to a second time point.

25 Claims, 10 Drawing Sheets

(56) References Cited

U.S. PATENT DOCUMENTS

| | | | |
|---|---|---|---|
| 8,779,346 B2* | 7/2014 | Fowler et al. | 250/214 DC |
| 2007/0216790 A1* | 9/2007 | Kok | H04N 5/37457 348/308 |
| 2008/0001065 A1* | 1/2008 | Ackland | 250/208.1 |
| 2008/0290382 A1 | 11/2008 | Hirota | |
| 2010/0019338 A1* | 1/2010 | Kwon et al. | 257/433 |
| 2010/0181464 A1* | 7/2010 | Veeder | 250/214 R |
| 2011/0149135 A1 | 6/2011 | Yamanaka | |
| 2012/0002090 A1 | 1/2012 | Aoki et al. | |
| 2014/0313387 A1* | 10/2014 | Vogelsang et al. | 348/308 |

* cited by examiner

IMAGE SENSOR AND IMAGE PROCESSING SYSTEM INCLUDING SUBPIXELS HAVING A TRANSFER CIRCUIT, COMPARATOR AND COUNTER FOR OUTPUTTING THE COUNT VALUE AS THE SUBPIXEL SIGNAL

CROSS-REFERENCE TO RELATED APPLICATIONS

This application claims priority under 35 U.S.C. §119 to U.S. Provisional Patent Application 61/713,175, filed on Oct. 12, 2012, and to Korean Patent Application No. 10-2013-0026460 filed on Mar. 13, 2013, the disclosure of each of which is hereby incorporated by reference in their entirety.

BACKGROUND

1. Field

Example embodiments of inventive concepts relate to image sensors, image processing systems including the same, and methods of operating image processing systems, and more particularly, to image sensors for generating images without distortion by controlling integration time, image processing systems including the same, and methods operating image processing systems.

2. Description of Conventional Art

A complementary metal oxide semiconductor (CMOS) image sensor is a sensing device that uses a CMOS. CMOS image sensors have lower manufacturing cost and smaller size than charge coupled device (CCD) image sensors having a high-voltage analog circuit, and thus, have an advantage of lower power consumption. In addition, the performance of CMOS image sensors has been improved as compared to an early development stage, and therefore, CMOS image sensors are usually used for various electronic appliances including portable devices such as smart phones and digital cameras.

With the various uses of CMOS image sensors, the minimization of a pixel array and a driving circuit in CMOS image sensors has been demanded. In addition, high-definition images without distortion are also demanded with the minimization. Therefore, approaches for meeting these demands have been researched and developed.

SUMMARY

At least one example embodiment of inventive concepts provides a method of operating an image processing system. According to at least this example embodiment, the method includes: accumulating photocharge in a plurality of subpixel groups in parallel from a first time point to a second time point in response to a first control signal, each of the plurality of subpixel groups including a plurality of rows of subpixels; and sequentially outputting subpixel signals corresponding to the accumulated photocharge in units of rows after the second time point in response to a second control signal. Each subpixel group may include a plurality of subpixels, and each of the plurality of subpixels may generate a subpixel signal corresponding to at least one photocharge accumulated in response to at least one photon.

According to at least some example embodiments, the photocharge accumulated prior to the first time point may be eliminated from the subpixel groups in response to a third control signal.

The sequentially outputting the subpixel signals may include: comparing a potential corresponding to the accumulated photocharge with a threshold signal; and generating each of the subpixel signals according to results of the comparison.

The subpixel signals may be pixelized by the subpixel groups. The pixelizing may include calculating a sum of the subpixel signals.

At least one other example embodiment provides an image sensor including: a pixel array including a plurality of subpixel groups, each including a plurality of subpixels, each of the plurality of subpixels being configured to generate a subpixel signal in a digital format corresponding to at least one photocharge accumulated in response to at least one photon. The image sensor further includes a row driver block configured to generate a first control signal to control operation of the pixel array. The first control signal may control the subpixels included in each of the subpixel groups to accumulate the photocharge in parallel from a first time point to a second time point.

The row driver block may generate a second control signal to control the subpixels included in each subpixel group to sequentially output the subpixel signals in units of rows after the second time point.

The image sensor may further include: a readout block configured to store, amplify and output the subpixel signals; and a timing generator configured to control operation of the row driver block and the readout block.

The row driver block may generate a third control signal to control the subpixels included in each subpixel group to eliminate photocharge accumulated prior to the first time point.

Each of the subpixels may include a comparator configured to: compare a potential corresponding to the accumulated photocharge with a threshold signal; and generate the subpixel signal according to a comparison result.

Each of the subpixels may include: a selection switch configured to output the subpixel signal in response to the second control signal; and a reset switch configured to eliminate the accumulated photocharge in response to the third control signal.

The first control signal may control the subpixels included in each of the plurality of subpixel groups in a row of the pixel array to accumulate the photocharge from the first time point to the second time point.

Alternatively, the first control signal may control the plurality of subpixels included in the pixel array to accumulate the photocharge from the first time point to the second time point.

Each of the subpixel groups may output a plurality of subpixel signals corresponding to a single pixel.

At least one other example embodiment provides an image processing system including: an image sensor including a pixel array having a plurality of subpixel groups, each including a plurality of subpixels, each of the plurality of subpixels being configured to generate a subpixel signal corresponding to at least one photocharge accumulated in response to at least one photon; and a row driver block configured to generate a first control signal to control operation of the pixel array. The image processing system further includes: an image signal processor configured to: pixelize subpixel signals by the subpixel groups; and generate image data. The first control signal controls the subpixels included in each of the subpixel groups to accumulate the photocharge in parallel from a first time point to a second time point.

At least one other example embodiment provides an image sensor chip including a first wafer including the above-described image sensor and a second wafer including the above-described image signal processor. The first wafer and the second wafer may be formed in a wafer stack structure.

At least one other example embodiment provides an electronic system including: an image sensor including a pixel array, which includes a plurality of subpixel groups, each of the plurality of subpixel groups including a plurality of subpixels, each of the plurality of subpixels being configured to generate a subpixel signal corresponding to at least one photocharge accumulated in response to at least one photon. The image sensor further includes a row driver block configured to: generate a first control signal to control the pixel array. The electronic system further includes: an image signal processor configured to pixelize subpixel signals by the subpixel groups and to generate image data; a processor configured to control operation of the image sensor and the image signal processor; and a memory configured to store the image data and commands to control the image sensor and the image signal processor. The first control signal controls the subpixels included in each of the subpixel groups to accumulate the photocharge in parallel from a first time point to a second time point.

At least one other example embodiment provides an image sensor including: a pixel array including a plurality of subpixel groups, each of the plurality of subpixel groups including a plurality of subpixels, the plurality of subpixels in each subpixel group being configured to accumulate photocharge concurrently during a first time period, and generate subpixel signals based on the accumulated photocharge.

According to at least some example embodiments, the image sensor may further include: a row driver block configured to control the plurality of subpixels in each subpixel group to accumulate the photocharge concurrently during the first time period.

The pixel array may be further configured to sequentially output the subpixel signals in units of rows of subpixel groups after expiration of the first time period.

Each of the plurality of subpixels may include: a detection circuit configured to detect at least one photon, and generate at least one photocharge based on the detected photon; a transfer circuit configured to accumulate the photocharge during the first time period, and generate an electrical signal based on the accumulated photocharge; and a selection circuit configured to generate the subpixel signal based on the electrical signal.

The electrical signal generated by the transfer circuit is may be a comparison signal, the transfer circuit may be configured to output a plurality of comparison signals, and the selection circuit may further include: a counter configured to count the plurality of comparison signals; and output the count value as the subpixel signal.

According to at least some example embodiments, the image sensor may further include: a readout circuit configured to store and output the subpixel signals.

At least one other example embodiment provides an image sensor including: a pixel array including a plurality of subpixel groups, each of the plurality of subpixel groups including a plurality of subpixels, the plurality of subpixels in each subpixel group being configured to: accumulate photocharge concurrently during a first time period; and generate a plurality of comparison signals based on the accumulated photocharge and a threshold signal. The image sensor further includes a readout circuit configured to: count the plurality of comparison signals, store the count values, and output the count values as subpixel signals.

According to at least some example embodiments, each of the plurality of subpixels may include: a detection circuit configured to detect at least one photon, and generate at least one photocharge based on the detected photon; a transfer circuit configured to accumulate the photocharge during the first time period, and generate an electrical signal based on the accumulated photocharge; and a selection circuit configured to output the electrical signal.

At least one other example embodiment provides an image sensor including: a row driver block configured to control a plurality of subpixel groups of a pixel array to accumulate photocharge concurrently during a first time period.

The row driver block may be further configured to control the plurality of subpixel groups to output subpixel signals corresponding to the accumulated photocharge sequentially in units of rows of subpixel groups after expiration of the first time period.

According to at least some example embodiments, the image sensor may further include: the pixel array including the plurality of subpixel groups, each of the plurality of subpixel groups including a plurality of subpixels configured to generate subpixel signals based on the accumulated photocharge.

Each of the plurality of subpixels may include: a detection circuit configured to detect at least one photon and generate at least one photocharge based on the detected photon; a transfer circuit configured to accumulate the photocharge generated during the first time period, and generate an electrical signal based on the accumulated photocharge; and a selection circuit configured to generate the subpixel signal based on the electrical signal.

The electrical signal generated by the transfer circuit may be a comparison signal, and the transfer circuit may be configured to output a plurality of comparison signals, and the selection circuit may further include: a counter configured to count the plurality of comparison signals, and output the count value as the subpixel signal.

According to at least some example embodiments, the image sensor may further include: a readout circuit configured to store and output the subpixel signals.

The image sensor may further include: the pixel array including a plurality of subpixel groups, each of the plurality of subpixel groups including a plurality of subpixels, the plurality of subpixels in each subpixel group being configured to: accumulate photocharge concurrently during the first time period; and generate a plurality of comparison signals based on the accumulated photocharge and a threshold signal. A readout circuit may be configured to: count the plurality of comparison signals; store the count values; and output the count values as subpixel signals.

BRIEF DESCRIPTION OF THE DRAWINGS

The above and other features and advantages of inventive concepts will become more apparent by describing in detail example embodiments thereof with reference to the attached drawings in which.

DETAILED DESCRIPTION

Figure 1:
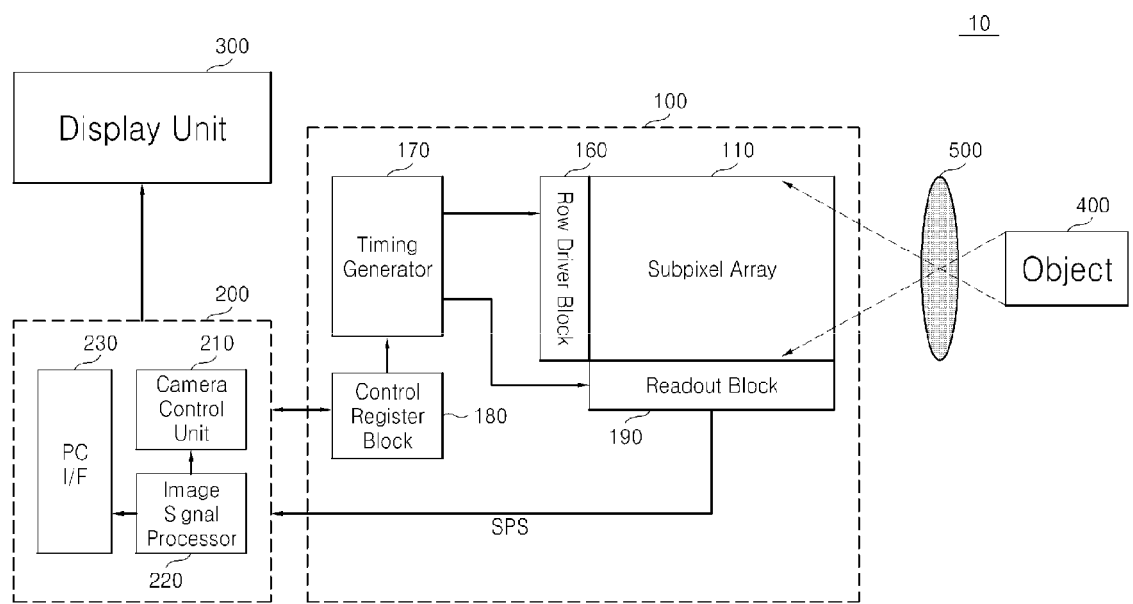
FIG. 1 is a block diagram of an image processing system according to some example embodiments of inventive concepts.

Inventive concepts now will be described more fully hereinafter with reference to the accompanying drawings, in which example embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image processing system 10 according to some example embodiments of inventive concepts. The image processing system 10 may include an image sensor 100, an image processor or a digital signal processor (DSP) 200, a display unit 300, and a lens unit 500. The image sensor 100 may include a subpixel array 110, a row driver block 160, a timing generator 170, a control register block 180, and a readout block 190.

The image sensor 100 may be controlled by the image processor 200 to sense an object 400 captured through the lens unit 500. The image processor 200 may output an image of the object 400, which has been sensed by the image sensor 100, to the display unit 300. At this time, the display unit 300 may be any device that can output an image. For instance, the display unit 300 may be implemented as a computer, a mobile phone, or an electronic device equipped with a camera.

The image processor 200 may include a camera control unit 210, an image signal processor 220, and a personal computer interface (PC I/F) 230. The camera control unit 210 controls the control register block 180. The camera control unit 210 may control the image sensor 100, and more specifically, the control register block 180 using an inter-integrated circuit ($I^2C$), but the scope of inventive concepts is not restricted thereto.

The image signal processor 220 receives a subpixel signal SPS, that is, an output signal of the readout block 190 and processes the subpixel signal SPS of each subpixel or each pixel into image data nice for people to look at. The image signal processor 220 outputs the image data to the display unit 300 through the PC I/F 230.

Figure 3:
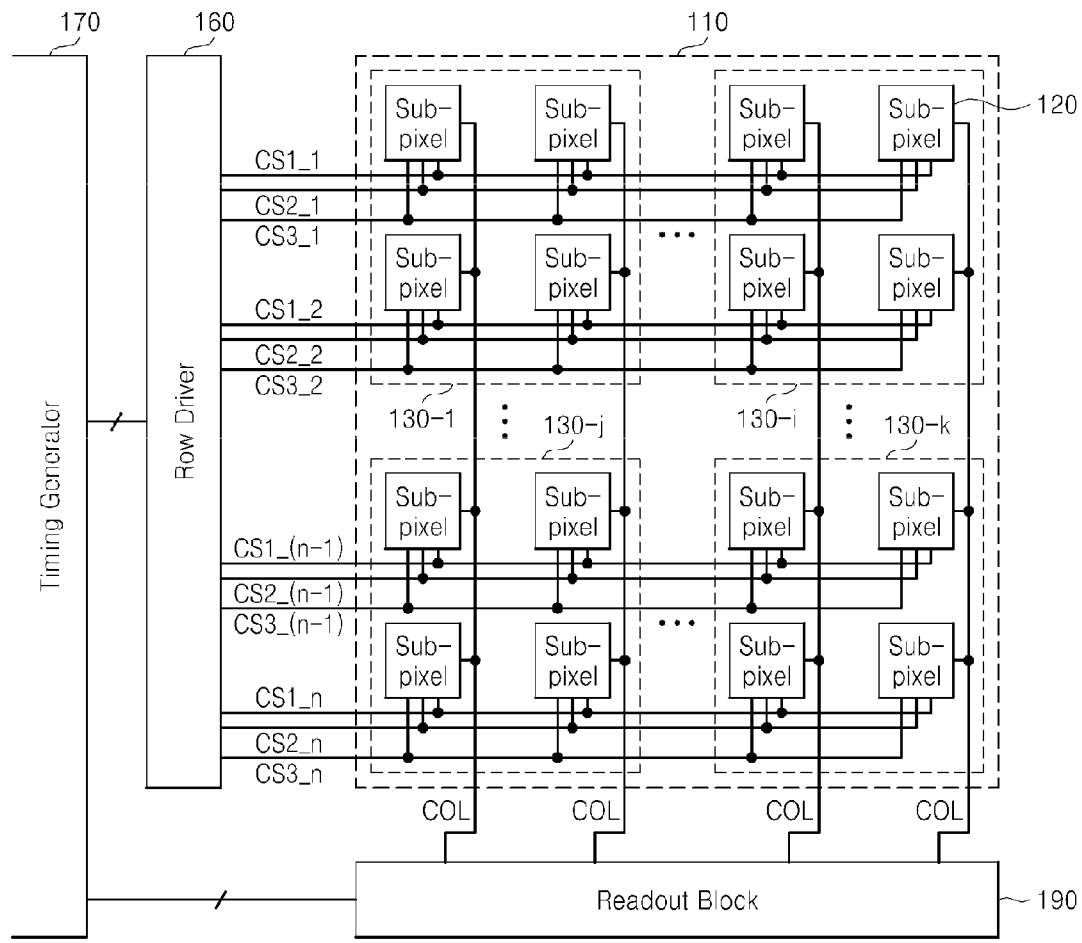
FIG. 3 is a diagram for explaining example operation of a subpixel array illustrated in FIG. 1 according to some example embodiments of inventive concepts.
Figure 4:
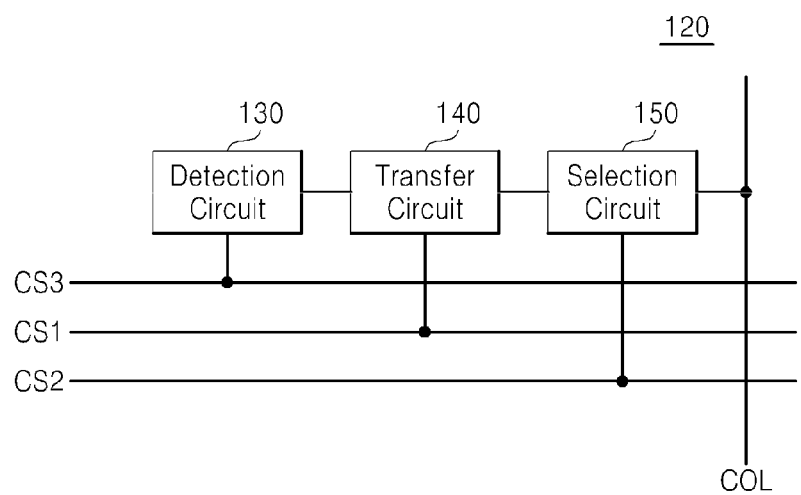
FIG. 4 is a detailed block diagram of an example embodiment of a subpixel illustrated in FIG. 3.

The subpixel array 110 may include a plurality of subpixels (120 in FIGS. 3 and 4). Each subpixel 120 may sense light incident through the lens unit 500 and generate the subpixel signal SPS according to the control of the row driver block 160. The subpixel signal SPS may be a digital signal having at least two levels. The subpixel 120 will be described in detail with reference to FIGS. 4 through 6 later.

The timing generator 170 may output a control signal or a clock signal to the row driver block 160 and the readout block 190 to control the operations or the timing of the row driver block 160 and the readout block 190. The control register block 180 is controlled by the camera control unit 210. The control register block 180 stores various commands necessary for the operation of the image sensor 100 and transmits the commands to the timing generator 170.

The row driver block 160 drives the subpixel array 110 in row units. The row driver block 160 may provide a first control signal (CS1 in FIGS. 3 and 4), a second control signal (CS2 in FIGS. 3 and 4), and a third control signal (CS3 in FIGS. 3 and 4) for each subpixel 120 in the subpixel array 110. In other words, the row driver block 160 may decode a control signal from the timing generator 170 and apply the first through third control signals CS1 through CS3 to each of rows in the subpixel array 110.

The subpixel array 110 outputs the subpixel signal SPS from a row selected by the first control signal CS1 and the second control signal CS2, which are provided from the row driver block 160, to the readout block 190. The readout block 190 temporarily stores the subpixel signal SPS from the subpixel array 110 and senses and amplifies the subpixel signal SPS before outputting it. At this time, the readout block 190 may include a column memory (e.g., static random access memory (SRAM) 75 in FIGS. 7 and 81 in FIG. 8) provided for each of columns in the subpixel array 110 to temporarily store the subpixel signal SPS, a sense amplifier (not shown) sensing and amplifying the subpixel signal SPS, or a counter (not shown) counting the subpixel signal SPS stored temporarily. The readout block 190 will be described in detail with reference to FIGS. 7 and 8 later.

The lens unit 500 may include a main lens (not shown) and a micro-lens array (not shown). The main lens may be implemented in size corresponding to the subpixel array 110. The main lens enables an image of the object 400 to be formed. The micro-lens array may include a plurality of micro lenses (not shown). Each of the micro lenses may be implemented in size corresponding to a subpixel group (e.g., 130-1 in FIG. 3) in the subpixel array 110. Each micro lens focuses an image in the subpixel group (e.g., 130-1 in FIG. 3).

Figure 2:
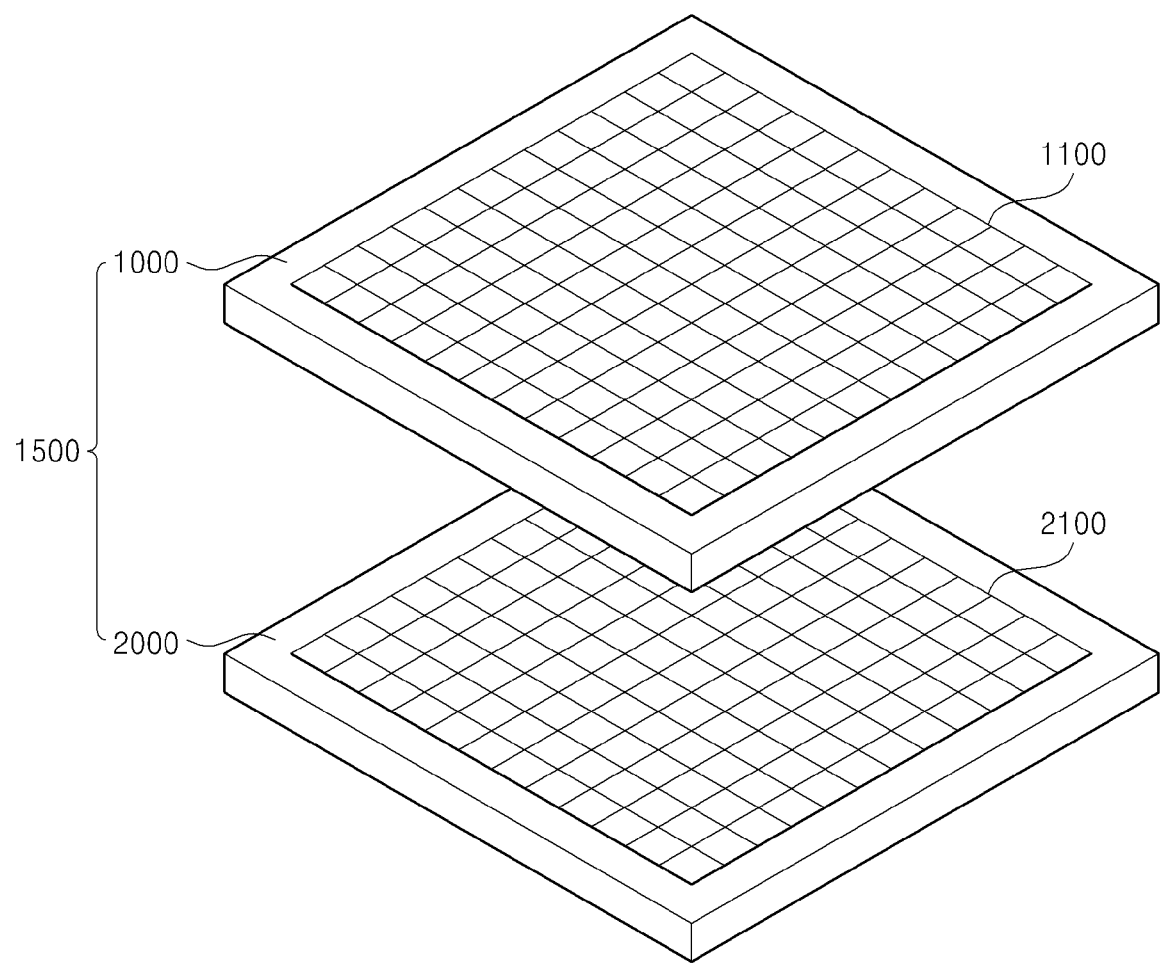
FIG. 2 is a block diagram of a wafer stack for explaining an example embodiment of a method of manufacturing the image processing system illustrated in FIG. 1.

FIG. 2 is a block diagram of a wafer stack for explaining an example embodiment of a method of manufacturing the image processing system 10 illustrated in FIG. 1. Referring to FIGS. 1 and 2, a first wafer 1000 includes a plurality of dies 1100. Each of the dies 1100 may include the subpixel array 110 illustrated in FIG. 1. In other embodiments, each die 1100 may include the image sensor 100 illustrated in FIG. 1.

A second wafer 2000 includes a plurality of dies 2100. Each of the dies 2100 may include the image signal processor 220 illustrated in FIG. 1. In other embodiments, each dies 2100 may be the image processor 200 illustrated in FIG. 1.

Here, the image sensor 100 and the image processor 200 may be implemented in a wafer stack in which circuits included in the image sensor 100 and the image processor 200 are adequately embodied. In other words, the dies 1100 in the first wafer 1000 and the dies 2100 in the second wafer 2000 may form a single chip, that is, an image sensor chip 1500 in a wafer stack structure.

FIG. 3 is a diagram for explaining example operations of the subpixel array 110 illustrated in FIG. 1 according to some example embodiments of inventive concepts. Referring to FIGS. 1 and 3, the subpixel array 110 includes a plurality of subpixels 120 arranged in a matrix form. Each subpixel 120 may be called a jot. A subpixel pitch is less than a normal pixel pitch. The subpixels 120 may be grouped into first subpixel group 130-1 through a k-th subpixel group 130-k, each of which includes a plurality of subpixels 120 in a matrix form.

Although each of the first through k-th subpixel groups 130-1 through 130-k includes four subpixels 120 in the embodiments illustrated in FIG. 3, inventive concepts are not restricted to the current embodiments. The subpixel array 110 may output the subpixel signal SPS of each row along a column line COL according to the control of the timing generator 170.

A filter array (not shown) including a color filter or a shield, which transmits or shields light in a predetermined spectrum, may be placed above the subpixels 120 included in the subpixel array 110. In addition, a pixel lens array (not shown) enhancing a light gathering power of the subpixels 120 may be placed above the subpixels 120 included in the subpixel array 110. The structure and the operation of each of the subpixels 120 will be described in detail with reference to FIGS. 4 through 6.

The row driver block 160 drives a plurality of the control signals CS 1 through CS3 for controlling the operation of each subpixel 120 to the subpixel array 110 according to the control of the timing generator 170. The control signals CS1 through CS3 may control the transmission of photocharge generated by the subpixel 120 or select or reset the subpixel 120.

The readout block 190 includes various elements (e.g., a counter, a memory, a readout circuit, and/or a sense amplifier circuit) that process subpixel signals SPS output from the subpixel array 110.

The image signal processor 220 may process the subpixel signals SPS output from the first through k-th subpixel groups 130-1 through 130-k. In other words, the image signal processor 220 may pixelize the subpixel signals SPS of each subpixel group (e.g., 130-1) (for instance, the image signal processor 220 may treat the sum of the subpixel signals SPS of a single subpixel group as a pixel signal of a single pixel) and then compose or correct an image in units of pixels.

In other example embodiments, the subpixel signals SPS output from the readout block 190 may form different light field images respectively corresponding to pixels of the respective first through k-th subpixel groups 130-1 through 130-k. In other words, each of the first through k-th subpixel groups 130-1 through 130-k outputs subpixel signals SPS corresponding to one of first through k-th subpixel images that respectively pass through the micro lenses. The image signal processor 220 may process the subpixel signals SPS corresponding to the first through k-th subpixel images, thereby generating angular information, depth data, and a high-resolution image. The image signal processor 220 may refocus the high-resolution image.

FIG. 4 is a detailed block diagram of an example embodiment of the subpixel 120 illustrated in FIG. 3. Referring to FIGS. 1, 3, and 4, the subpixel 120 may include a detection circuit 130, a transfer circuit 140, and a selection circuit 150.

The detection circuit 130 may generate photocharge varying with the intensity of light incident through the lens unit 500. The detection circuit 130 may detect at least one photon and generate at least one photocharge. The detection circuit 130 may eliminate the photocharge in response to the third control signal CS3 received from the row driver block 160.

The transfer circuit 140 may accumulate photocharge from a first time point to a second time point in response to the first control signal CS 1 and may generate an electrical signal corresponding to the accumulated photocharge. The selection circuit 150 may output the electrical signal to the column line COL as a subpixel signal SPS in response to the second control signal CS2.

Figure 5:
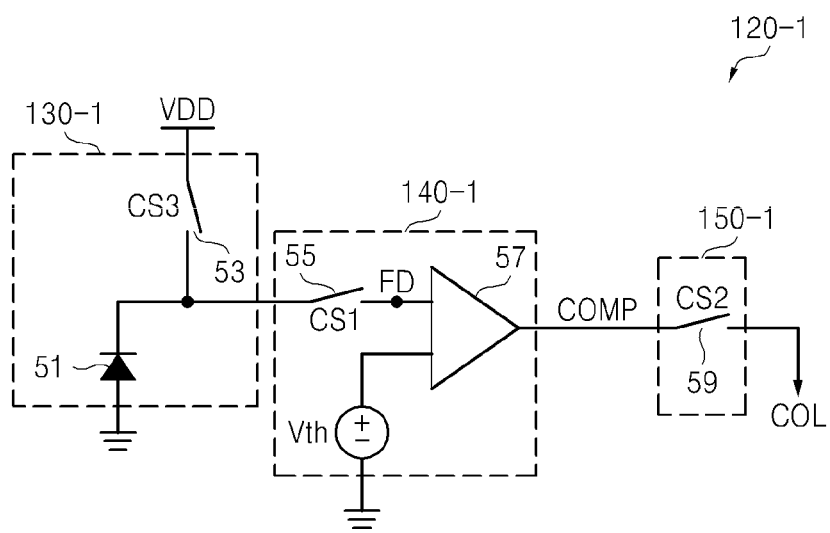
FIG. 5 is a block diagram of another example embodiment of the subpixel illustrated in FIG. 4.

FIG. 5 is a block diagram of another example embodiment of the subpixel illustrated in FIG. 4. Referring to FIG. 1 and FIGS. 3 through 5, the subpixel 120-1 may include a detection circuit 130-1, a transfer circuit 140-1, and a selection circuit 150-1.

The subpixel 120-1 has a binary output. For instance, when there is a single photon in the subpixel 120-1, the output of the subpixel 120-1 is "1". When there is no photon in the subpixel 120-1, the output of the subpixel 120-1 is "0".

The detection circuit 130-1 includes a photodetector 51 and a reset switch 53. The photodetector 51 may detect at least one photon and generate at least one photocharge corresponding to the photon. The photodetector 51 may be implemented by a photodiode, a phototransistor, or a pinned photodiode.

The reset switch 53 may be connected between an end of the photodetector 51 and a node providing a power supply voltage VDD. The reset switch 53 may be switched in response to the third control signal CS3 to eliminate the photocharge generated by the photodetector 51. The reset switch 53 may be implemented by a transistor.

The transfer circuit 140-1 may include a transfer switch 55 and a comparator 57. The transfer switch 55 may transfer photocharge generated by the photodetector 51 to a floating diffusion FD in response to the first control signal CS1.

The comparator 57 compares a threshold signal Vth with the photocharge accumulated at the floating diffusion FD and outputs a comparison signal COMP according to the result of the comparison. When the potential of the floating diffusion FD, at which the photocharge has been accumulated, is higher than the threshold signal Vth, the comparison signal COMP is "1". In other words, when the photodetector 51 generates a photocharge and the transfer switch 55 transfers the photocharge to the floating diffusion FD, the comparison signal COMP is "1".

When the potential of the floating diffusion FD, at which the photocharge has been accumulated, is lower than the threshold signal Vth, the comparison signal COMP is "0". In other words, when the photodetector 51 does not generate a photocharge or when the transfer switch 55 does not transfer a photocharge to the floating diffusion FD even if the photodetector 51 generates the photocharge, the comparison signal COMP is "0".

The selection circuit 150-1 may include a selection switch 59. The selection switch 59 is connected between an output terminal of the comparator 57 and the column line COL. The selection switch 59 outputs the comparison signal COMP to the column line COL in response to the second control signal CS2. The selection switch 59 may be implemented by a transistor.

Figure 6:
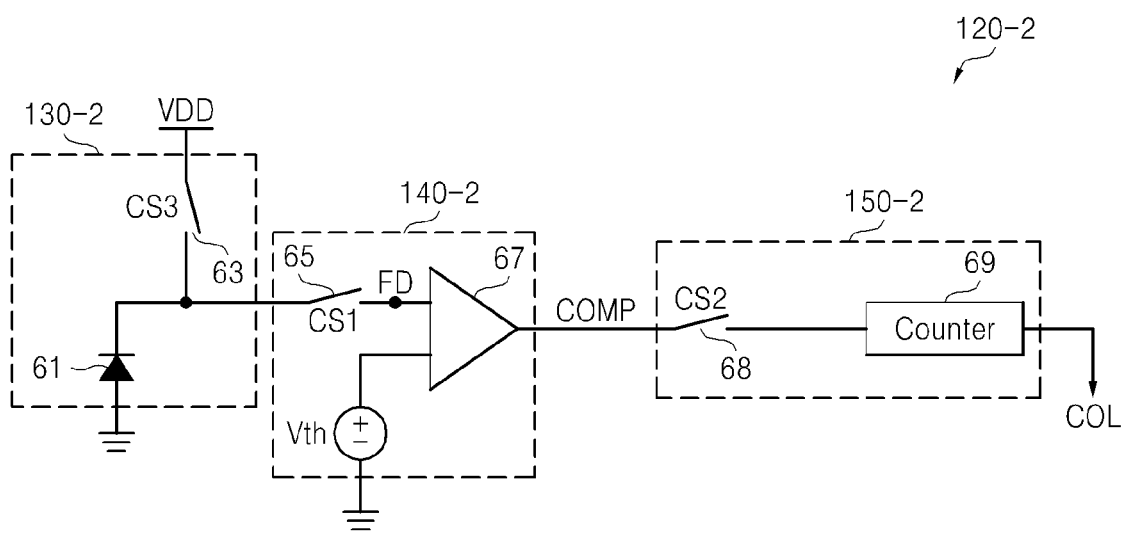
FIG. 6 is a block diagram of another example embodiment of the subpixel illustrated in FIG. 4.

FIG. 6 is a block diagram of another example embodiment of the subpixel illustrated in FIG. 4. Referring to FIG. 1 and FIGS. 3 through 6, the subpixel 120-2 may include a detection circuit 130-2, a transfer circuit 140-2, and a selection circuit 150-2.

The operations and the functions of a photodetector 61, a reset switch 63, a transfer switch 65, a comparator 67, and a selection switch 68 included in the subpixel 120-2 are similar to those of the photodetector 51, the reset switch 53, the transfer switch 55, the comparator 57, and the selection switch 59 illustrated in FIG. 5. Thus, detailed descriptions thereof will be omitted.

A counter 69 counts the comparison signal COMP. The comparator 67 outputs a plurality of comparison signals over time. The counter 69 counts the comparison signals output from the comparator 67. The counter may be implemented using a register type circuit such as a flip-flop.

Figure 7:
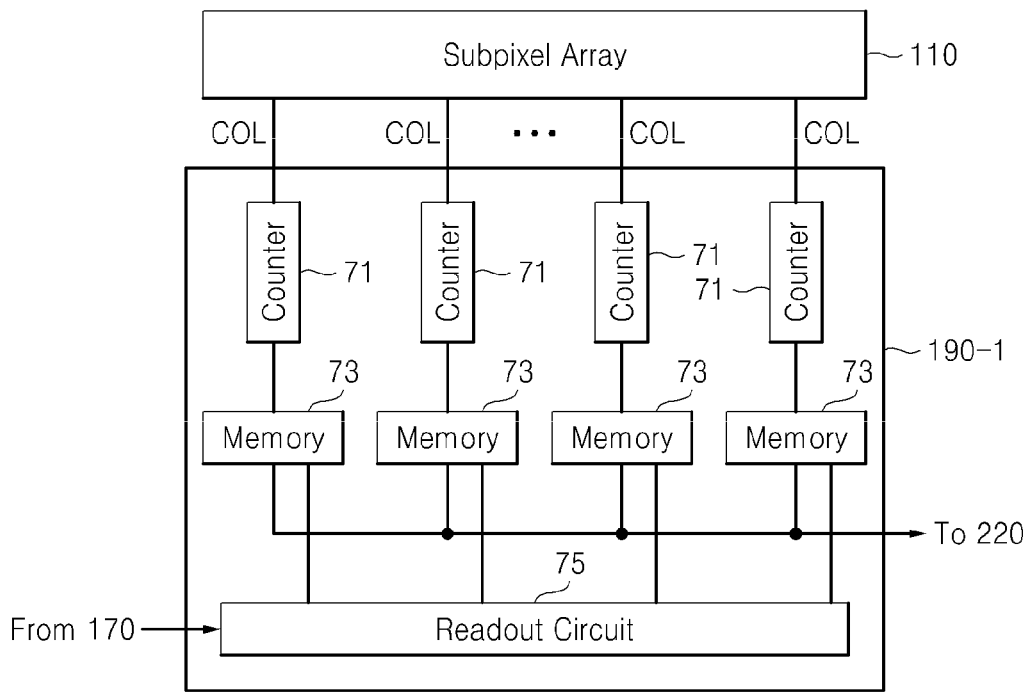
FIG. 7 is a block diagram of an example embodiment of a readout block illustrated in FIG. 1.

FIG. 7 is a block diagram of another example embodiment of the readout block illustrated in FIG. 1. Referring to FIG. 1, FIGS. 3 through 5, and FIG. 7, the readout block 190-1 may include a plurality of counters 71, a plurality of memories 73, and a readout circuit 75. The readout block 190-1 may be suitable for a case where the subpixel array 110 includes a plurality of subpixels having the structure of the subpixel 120-1 illustrated in FIG. 5.

Each of the counters 71 may count comparison signals COMP received through the column line from the subpixel 120-1. When the subpixel 120-1 outputs a plurality of comparison signals COMP over time, each counter 71 may count the comparison signals COMP received through the column line COL. The counters 71 may perform a counting operation in response to a control signal output from the timing generator 170.

Each of the memories 73 stores a count value output from a corresponding one of the counters 71. The memories 73 may store the count value in response to a control signal output from the timing generator 170.

The readout circuit 75 controls the memories 73 to output the count value to the image signal processor 220 as a subpixel signal SPS according to the control of the timing generator 170. In other words, the readout circuit 75 controls the count value stored in one of the memories 73 to be output to the image signal processor 220 according to the control of the timing generator 170. The readout circuit 75 may include a column decoder, a column driver, and an output buffer, which are not shown.

Figure 8:
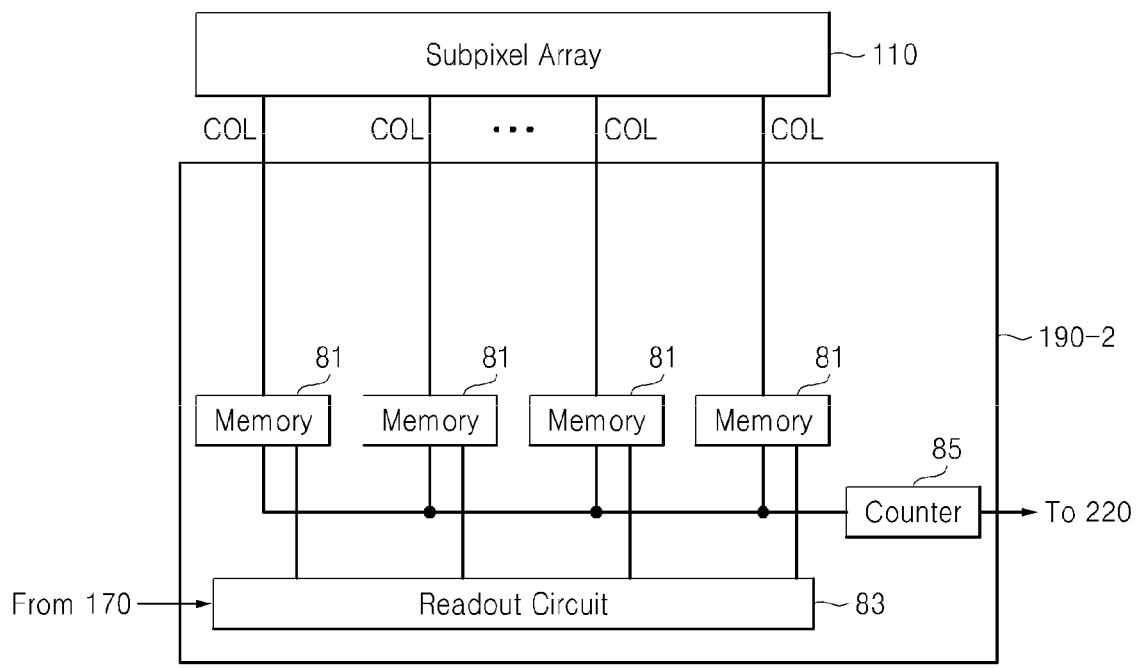
FIG. 8 is a block diagram of another example embodiment of the readout block illustrated in FIG. 1.

FIG. 8 is a block diagram of another example embodiment of the readout block illustrated in FIG. 1. Referring to FIG. 1, FIGS. 3 through 5, and FIGS. 7 and 8, the readout block 190-2 may include a plurality of memories 81, a readout circuit 83, and a counter 85. The readout block 190-2 may be suitable for a case where the subpixel array 110 includes a plurality of subpixels having the structure of the subpixel 120-1 illustrated in FIG. 5.

Each of the memories 81 may store a comparison signal COMP received from one of the subpixels 120-1. When each of the subpixels 120-1 outputs a plurality of comparison signals COMP over time, each of the memories 81 may store the comparison signals COMP received from one of the subpixels 120-1. The comparison signals COMP are binary outputs. The memories 81 may store the comparison signals COMP in response to a control signal output from the timing generator 170.

The readout circuit 83 may control the memories 81 to output the comparison signals COMP stored in each of the memories 81 to the counter 85 according to the control of the timing generator 170. In other words, the readout circuit 83 may control the comparison signals COMP stored in one of the memories 81 to be output to the counter 85 according to the control of the timing generator 170.

The counter 85 counts the comparison signals COMP and outputs a count value to the image signal processor 220 as a subpixel signal SPS. The counter 85 may perform a counting operation in response to a control signal output from the timing generator 170.

Figure 9:
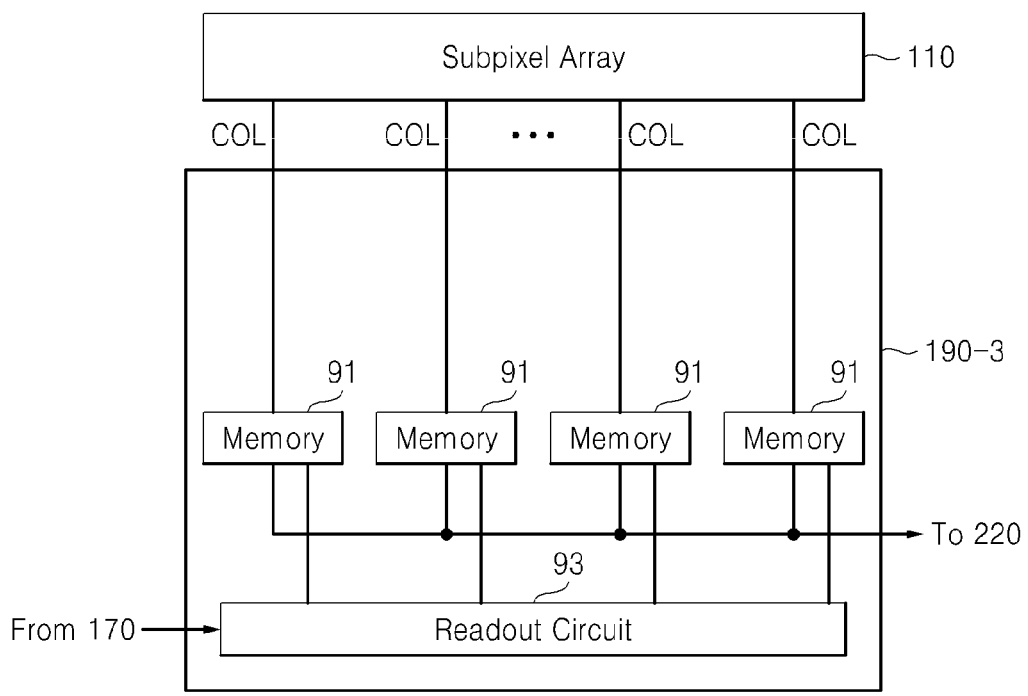
FIG. 9 is a block diagram of yet another example embodiment of the readout block illustrated in FIG. 1.

FIG. 9 is a block diagram of yet another example embodiment of the readout block illustrated in FIG. 1. Referring to FIG. 1, FIGS. 3 through 6, and FIG. 9, the readout block 190-3 includes a plurality of memories 91 and a readout circuit 93. The readout block 190-3 may be suitable for a case where the subpixel array 110 includes a plurality of subpixels having the structure of the subpixel 120-2 illustrated in FIG. 6.

Each of the memories 91 may store a count value received from one of subpixels 120-2. The memories 91 may store the count value in response to a control signal output from the timing generator 170.

The readout circuit 93 may control each of the memories 91 to output the count value as a subpixel signal SPS to the image signal processor 220 according to the control of the timing generator 170. In other words, the readout circuit 93 may control the count value stored in one of the memories 91 to be output as the subpixel signal SPS to the image signal processor 220 according to the control of the timing generator 170.

Figure 10:
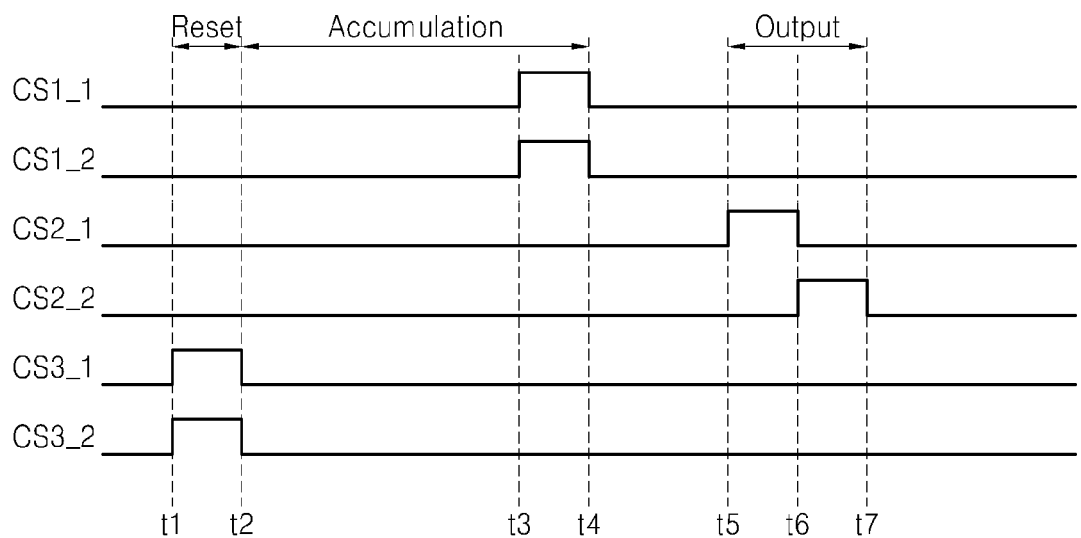
FIG. 10 is a timing chart of example first through third control signals applied to a first subpixel group illustrated in FIG. 3.

FIG. 10 is an example timing chart of first through third control signals applied to the first subpixel group 130-1 illustrated in FIG. 3. Referring to FIGS. 1, 3, 4, and 10, the first subpixel group 130-1 may operate in response to first control signals CS1_1 and CS1_2, second control signals CS2_1 and CS2_2, and third control signals CS3_1 and CS3_2, which are received from the row driver block 160.

The third control signal CS3_1 for a first row and the third control signal CS3_2 for a second row may have a high logic level from a first time point t1 to a second time point t2. Accordingly, subpixels 120 in the first row of the first subpixel group 130-1 may eliminate photocharge, which has been generated till the first time point t1, in a reset period from the first time point t1 to the second time point t2 in response to the third control signal CS3_1 for the first row; and subpixels 120 in the second row of the first subpixel group 130-1 may eliminate photocharge, which has been generated prior to the first time point t1, in the reset period in response to the third control signal CS3_2 for the second row.

After the second time point t2, the first control signal CS1_1 for the first row and the first control signal CS1_2 for the second row may have a high logic level from a third time point t3 to a fourth time point t4. The subpixels 120 in the first row of the first subpixel group 130-1 may accumulate photocharge till the fourth time point t4 in an accumulation period in response to the first control signal CS1_1 for the first row; and the subpixels 120 in the second row of the first subpixel group 130-1 may accumulate photocharge till the fourth time point t4 in the accumulation period in response to the first control signal CS1_2 for the second row. The subpixels 120 in the first and second rows of the first subpixel group 130-1 may generate an electrical signal (e.g., the comparison signal COMP in FIG. 5 or the count value in FIG. 6) corresponding to the accumulated photocharge after the fourth time point t4. Accordingly, the first time point described with reference to FIG. 4 may correspond to the second time point t2 illustrated in FIG. 10 and the second time point described with reference to FIG. 4 may correspond to the fourth time point t4 illustrated in FIG. 10.

After the fourth time point t4, the second control signal CS2_1 for the first row may have a logic high level from a fifth time point t5 to a sixth time point t6 and the second control signal CS2_2 for the second row may have a logic high level from the sixth time point t6 to a seventh time point t7. The subpixels 120 in the first row of the first subpixel group 130-1 may output the electrical signal from the fifth time point t5 to the sixth time point t6 in response to the second control signal CS2_1 for the first row; and the subpixels 120 in the second row of the first subpixel group 130-1 may output the electrical signal from the sixth time point t6 to the seventh time point t7 in response to the second control signal CS2_2 for the second row. In other words, the subpixels 120 in the first and second rows of the first subpixel group 130-1 may sequentially output the electrical signals from the fifth time point t5 to the seventh time point t7 in an output period.

Although the control signals CS1-1 through CS3_2 only applied to the first subpixel group 130-1 are illustrated in FIG. 10, subpixel groups in the same row as the first subpixel group 130-1 may be controlled in the same manner as the first subpixel group 130-1. In addition, subpixel groups in different rows than the first subpixel group 130-1 may be controlled in different manners than the first subpixel group 130-1. For instance, photocharge elimination and accumulation for subpixel groups formed after the second row of subpixels 120 may be carried out sequentially on subpixel groups in the same row.

In order to remove an offset of each subpixel 120, the first subpixel group 130-1 may accumulate photocharges remaining after the simultaneous reset period in response to the first control signals CS1_1 and CS1_2 and sequentially output electrical signals respectively corresponding to the photocharges accumulated in the respective subpixels 120 in response to the second control signals CS2_1 and CS2_2. Therefore, the image sensor 100 enables subpixels 120 in the same subpixel group having a binary output to accumulate photocharge at the same time, thereby removing image distortion caused by a time difference in photocharge accumulation.

Figure 11:
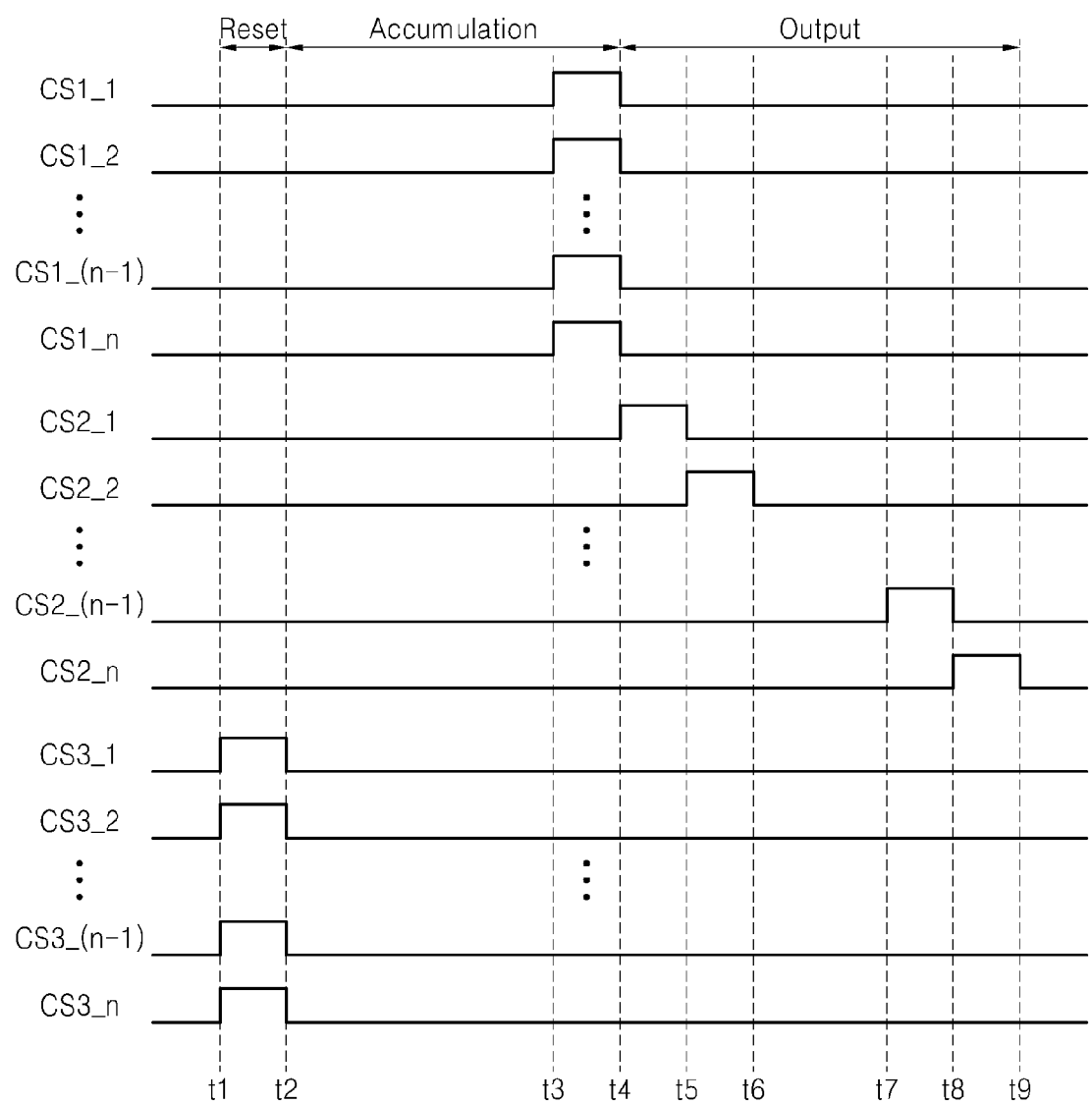
FIG. 11 is a timing chart of example first through third control signals applied to the subpixel array illustrated in FIG. 3.

FIG. 11 is an example timing chart of first through third control signals applied to the subpixel array 110 illustrated in FIG. 3. Referring to FIGS. 1, 3, 4, and 11, the subpixel groups 130-1 through 130-$k$ in the subpixel array 110 may operate in response to first control signals CS1_1 through CS1_$n$, second control signals CS2_1 through CS2_$n$, and third control signals CS3_1 through CS3_$n$.

The third control signal CS3_1 for the first row through the third control signal CS3_$n$ for the n-th row may have the high logic level from the first time point t1 to the second time point t2. Accordingly, the subpixel groups 130-1 through 130-$k$ in the subpixel array 110 may eliminate photocharge, which has been generated prior to (or until) the first time point t1, in the reset period from the first time point t1 to the second time point t2 in response to the third control signals CS3_1 through CS3_$n$.

After the second time point t2, the first control signal CS1_1 for the first row through the first control signal CS1_$n$ for the n-th row may have the high logic level from the third time point t3 to the fourth time point t4. The subpixel groups 130-1 through 130-$k$ in the subpixel array 110 may accumulate photocharge till the fourth time point t4 in the accumulation period in response to the first control signals CS1_1 through CS1_$n$. The subpixel groups 130-1 through 130-$k$ in the subpixel array 110 may generate an electrical signal corresponding to the accumulated photocharge after the fourth time point t4. Accordingly, the first time point described with reference to FIG. 4 may correspond to the second time point t2 illustrated in FIG. 11 and the second time point described with reference to FIG. 4 may correspond to the fourth time point t4 illustrated in FIG. 11.

The second control signal CS2_1 for the first row may have the logic high level from the fourth time point t4 to the fifth time point t5 and the second control signal CS2_2 for the second row may have the logic high level from the fifth time point t5 to the sixth time point t6. The second control signals CS2_3 through CS2_(n−2) respectively for the third through (n−2)-th rows may sequentially have the logic high level between the sixth time point t6 and the seventh time point t7. The second control signal CS2_(n−1) for the (n−1)-th row may have the logic high level from the seventh time point t7 to an eighth time point t8. The second control signal CS2_$n$ for the n-th row may have the logic high level from the eighth time point t8 to a ninth time point t9. In other words, the subpixels 120 in the respective rows of the subpixel array 110 may sequentially and respectively output the electrical signals in response to the second control signals CS2_1 through CS2_$n$, respectively, from the fourth time point t4 to the ninth time point t9.

Consequently, the subpixels 120 included in the subpixel array 110 may perform the photocharge elimination and accumulation at the same time and subpixels 120 respectively in the different rows may sequentially output the electrical signals.

In order to remove an offset of each subpixel 120, the subpixel groups 130-1 through 130-$k$ may accumulate photocharge remaining after the reset period at the same time in response to the first control signals CS1_1 through CS1_$n$ and may sequentially output the electrical signal corresponding to the accumulated photocharge in response to the second control signals CS2_1 through CS2_$n$.

Therefore, the image sensor 100 enables subpixels 120 in one subpixel array 110 having a binary output to accumulate photocharge at the same time, thereby removing image distortion caused by a time difference in photocharge accumulation.

Figure 12:
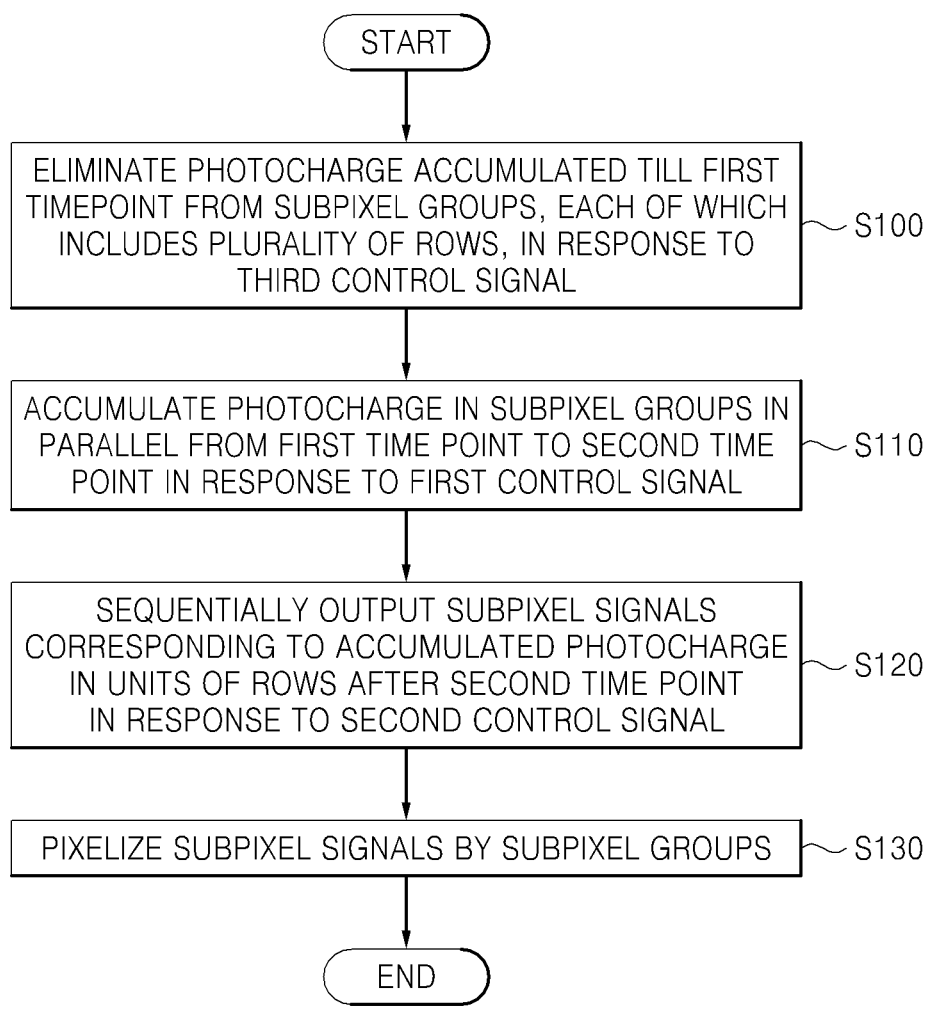
FIG. 12 is a flowchart of a method of operating the image processing system illustrated in FIG. 1 according to some example embodiments of inventive concepts.
Figure 13:
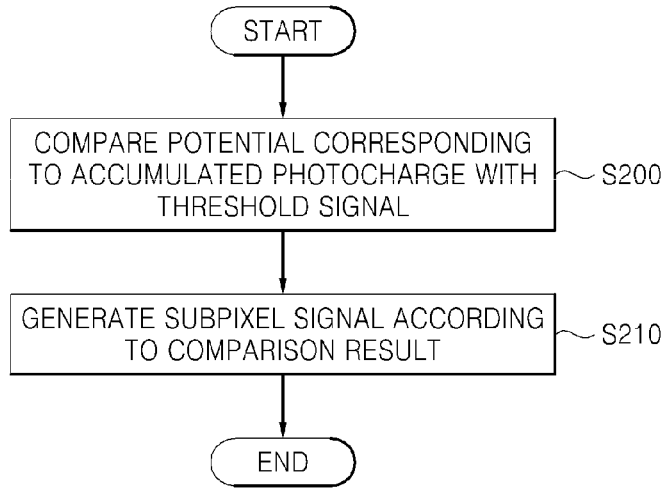
FIG. 13 is a detailed flowchart of example operation of outputting subpixel signals in the method illustrated in FIG. 12.

FIG. 12 is a flowchart of a method of operating the image processing system illustrated in FIG. 1 according to some example embodiments of inventive concepts. FIG. 13 is a detailed flowchart of example operation of outputting subpixel signals SPS in the method illustrated in FIG. 12.

Referring to FIGS. 1, 3, 4, 12, and 13, the subpixel groups 130-1 through 130-$k$ each including a plurality of rows may eliminate photocharge that has been accumulated prior to the first time point in response to the third control signal CS3 in operation S100. The subpixel groups 130-1 through 130-$k$ may accumulate photocharge from the first time point to the second time point in response to the first control signal CS1 in operation S110.

The subpixel groups 130-1 through 130-$k$ may sequentially output electrical signals, that is, the subpixel signals SPS, each of which corresponds to the accumulated photocharge, in units of rows in operation S120. In detail, the subpixel groups 130-1 through 130-$k$ may compare a potential corresponding to the accumulated photocharge with a threshold signal in operation S200. The subpixel groups 130-1 through 130-$k$ may generate a subpixel signal SPS according to the comparison result and sequentially output the subpixel signal SPS in units of rows in response to the second control signal in operation S210.

The readout block 190 temporarily stores and then senses and amplifies the subpixel signal SPS received from the subpixel array 110 and then transmits the subpixel signal SPS to the image signal processor 220. The image signal processor 220 may process subpixel signals SPS output from the subpixel groups 130-1 through 130-$k$ in operation S130. At this time, the image signal processor 220 may pixelize the subpixel signals SPS by subpixel groups.

Figure 14:
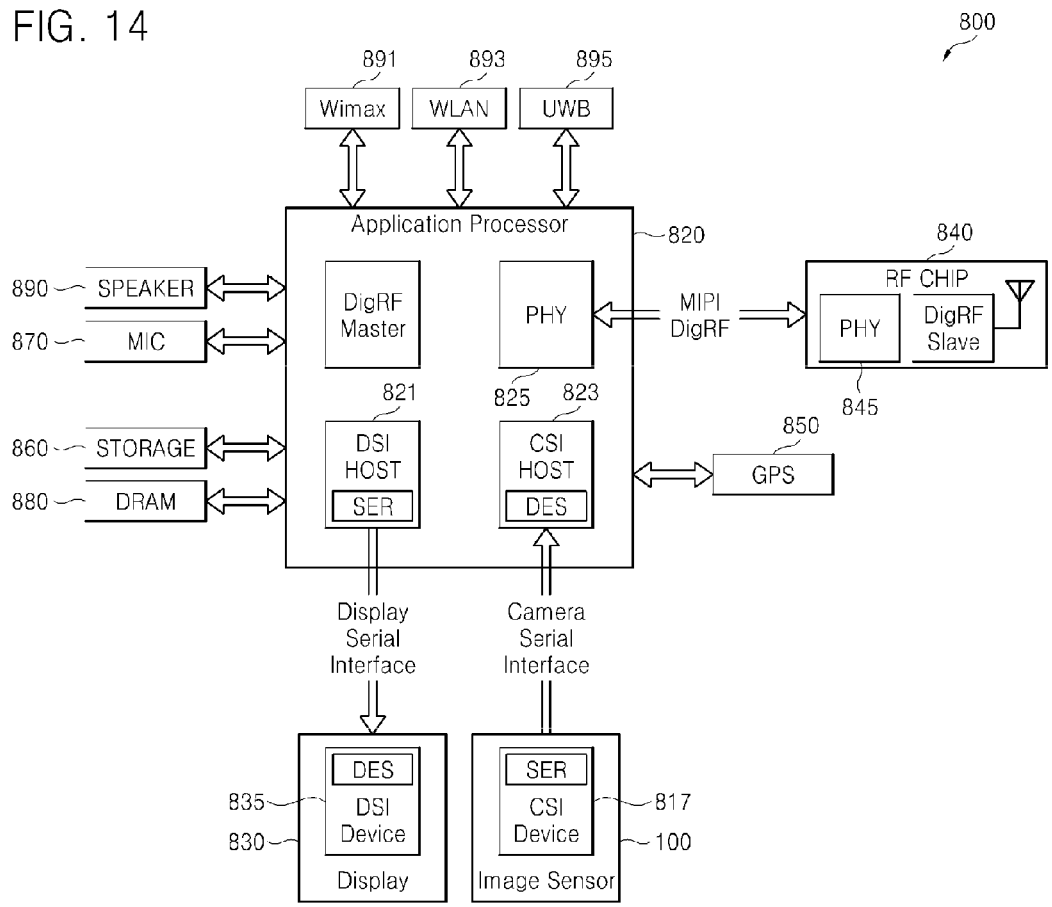
FIG. 14 is a block diagram of an image sensing system including the image sensor in FIG. 1 according to some example embodiments of inventive concepts.

FIG. 14 is a block diagram of an image sensing system including the image sensor in FIG. 1 according to some example embodiments of inventive concepts. Referring FIGS. 1 and 14, the image sensing system 800 may be implemented by a data processing apparatus, such as a mobile phone, a personal digital assistant (PDA), a portable media player (PMP), an IP TV, or a smart phone that can use or support the MIPI interface.

The image sensing system 800 includes the image sensor 100, an application processor 820 and a display 830.

A camera serial interface (CSI) host 823 included in the application processor 820 performs serial communication with a CSI device 817 included in a camera module 810 through CSI. For example, an optical de-serializer (DES) may be implemented in the CSI host 823, and an optical serializer (SER) may be implemented in the CSI device 817.

A display serial interface (DSI) host 821 included in the application processor 820 performs serial communication with a DSI device 835 included in the display 830 through DSI. For example, an optical serializer (SER) may be implemented in the DSI host 821, and an optical de-serializer (DES) may be implemented in the DSI device 835.

The image sensing system 800 may also include a radio frequency (RF) chip 840 which communicates with the application processor 820. A physical layer (PHY) 845 of the image sensing system 800 and a PHY of the RF chip 840 communicate data with each other according to a MIPI DigRF standard. The image sensing system 800 may further include at least one element among a GPS 850, a storage device 860, a microphone (MIC) 870, a DRAM 880 and a speaker 890. The image sensing system 800 may communicate using Wimax (world interoperability for microwave access) 891, WLAN (wireless lan) 893 and/or UWB (ultra wideband) 895, etc.

Figure 15:
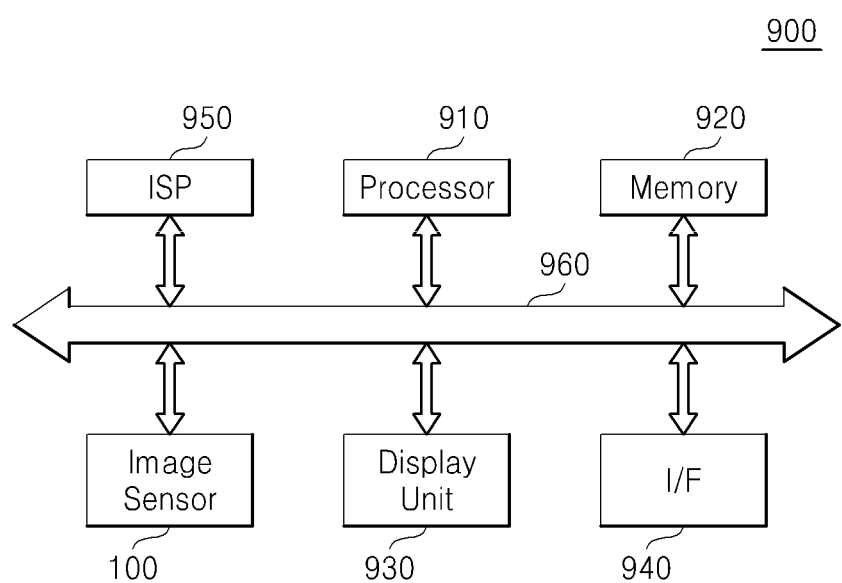
FIG. 15 is a block diagram of an image sensing system including the image sensor in FIG. 1 according to other example embodiments of inventive concepts.

FIG. 15 is a block diagram of an image sensing system including the image sensor in FIG. 1 according to other example embodiments of inventive concepts. Referring FIGS. 1 and 15, the image sensing system 900 may include the image sensor 100, a processor 910, a memory 920, a display unit 930, an interface 940 and an image signal processor 950.

The processor 910 may control the operation of the image sensor 100. The image signal processor 950 performs several operations (for example, image scaling and image enhancement) on signals output from the image sensor 100.

According to some embodiments, the processor 910 and the image signal processor 950 may be implemented as a one chip. The image signal processor 950 may corresponds to the image signal processor 220 in FIG. 1.

The memory 920 may store commands for controlling the image sensor 100 and images generated by the processor 910 or the image signal processor 950 via a bus 960, and the processor may execute commands stored in the memory 920.

The display unit 930 may receive the images from the processor 910 or the memory 920, and display the received images through a liquid crystal display (LCD) device, a light emitting diode (LED) display device, an organic LED (OLED) display device, an active matrix organic light emitting diodes (AMOLED) display device or a flexible display device.

The interface 940 may be implemented as an interface for inputting/outputting the images. According to some embodiments, The interface 940 may be implemented as a wireless interface.

Inventive concepts may also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish inventive concepts may be easily construed by programmers.

As described above, according to some embodiments of inventive concepts, an image sensor enables subpixels in a subpixel group having a binary output to accumulate photocharge at the same time, thereby removing image distortion caused by a time difference in photocharge accumulation.

While inventive concepts have been particularly shown and described with reference to exemplary embodiments thereof, it will be understood by those of ordinary skill in the art that various changes in forms and details may be made therein without departing from the spirit and scope of inventive concepts as defined by the following claims.

What is claimed is:
1. An image sensor comprising:
  a pixel array including a plurality of subpixel groups, each of the plurality of subpixel groups including a plurality of subpixels, and each of the plurality of subpixels being configured to generate a subpixel signal in digital format based on photocharge accumulated in response to at least one photon;

a row driver block configured to generate a first control signal to control operation of the pixel array;

wherein the first control signal controls the plurality of subpixels in each of the plurality of subpixel groups to accumulate the photocharge in parallel from a first time point to a second time point;

wherein each of the plurality of subpixels includes
- a detection circuit including a photodiode and a reset switch,
- a transfer circuit including a transfer switch and a comparator, the transfer circuit configured to output a plurality of comparison signals based on the accumulated photocharge, and
- a counter configured to (i) count the plurality of comparison signals, and
(ii) output the count value as the subpixel signal;

wherein the transfer switch is connected between the photodiode and an input of the comparator; and wherein a first terminal of the reset switch is connected to a node between the photodiode and the transfer switch, and a second terminal of the reset switch is connected to a voltage source.

2. The image sensor of claim 1, wherein the row driver block is configured to generate a second control signal to control the plurality of subpixels in each subpixel group to sequentially output the subpixel signals in units of rows after the second time point.

3. The image sensor of claim 2, further comprising:
a readout circuit configured to store, amplify and output the subpixel signals; and
a timing generator configured to control operation of the row driver block and the readout circuit.

4. The image sensor of claim 3, wherein the row driver block is configured to generate a third control signal to eliminate the photocharge accumulated in each of the plurality of subpixel groups prior to the first time point.

5. The image sensor of claim 4, wherein the comparator is configured to compare a potential corresponding to the accumulated photocharge with a threshold signal, and to generate the plurality of comparison signals based on the comparison result.

6. The image sensor of claim 5, wherein each of the plurality of subpixels further includes:
a selection switch configured to output the subpixel signal in response to the second control signal; and wherein
the reset switch is configured to eliminate the accumulated photocharge in response to the third control signal.

7. The image sensor of claim 1, wherein the first control signal controls the plurality of subpixels in each of the plurality of subpixel groups in a row of the pixel array to accumulate the photocharge from the first time point to the second time point.

8. The image sensor of claim 1, wherein each of the plurality of subpixel groups is configured to output a plurality of subpixel signals corresponding to a single pixel.

9. An image processing system comprising:
an image sensor including,
a pixel array having a plurality of subpixel groups, each of the plurality of subpixel groups including a plurality of subpixels, each of the plurality of subpixels being configured to generate a subpixel signal in digital format based on photocharge accumulated in response to at least one photon, and
a row driver block configured to generate a first control signal to control operation of the pixel array;

an image signal processor configured to pixelize the subpixel signals by subpixel group, and to generate image data;

wherein the first control signal controls the plurality of subpixels in each of the plurality of subpixel groups to accumulate the photocharge in parallel from a first time point to a second time point;

wherein each of the plurality of subpixels includes
- a detection circuit including a photodiode and a reset switch, and
- a transfer circuit including a transfer switch and a comparator, the transfer circuit configured to output a plurality of comparison signals based on the accumulated photocharge, and
- a counter configured to (i) count the plurality of comparison signals, and
(ii) output the count value as the subpixel signal;

wherein the transfer switch is connected between the photodiode and an input of the comparator; and wherein a first terminal of the reset switch is connected to a node between the photodiode and the transfer switch, and a second terminal of the reset switch is connected to a voltage source.

10. The image processing system of claim 9, wherein the row driver block is configured to generate a second control signal to control the plurality of subpixels in each of the plurality of subpixel groups to sequentially output the subpixel signals in units of rows after the second time point.

11. The image processing system of claim 10, further comprising:
a readout circuit configured to store, amplify and output the subpixel signals; and
a timing generator configured to control operation of the row driver block and the readout circuit.

12. The image processing system of claim 11, wherein the row driver block generates a third control signal to control the plurality of subpixels in each of the plurality of subpixel groups to eliminate photocharge accumulated prior to the first time point.

13. The image processing system of claim 12, wherein
the comparator is configured to compare a potential corresponding to the accumulated photocharge with a threshold signal, and to generate the plurality of comparison signals based on the comparison result.

14. The image processing system of claim 13, wherein each of the plurality of subpixels further includes:
a selection switch configured to output the subpixel signal in response to the second control signal; and wherein
the reset switch is configured to eliminate the accumulated photocharge in response to the third control signal.

15. The image processing system of claim 9, wherein the first control signal controls the plurality of subpixels in each of the plurality of subpixel groups in a row of the pixel array to accumulate the photocharge from the first time point to the second time point.

16. An image sensor chip including the image processing system of claim 9, the image sensor chip comprising:
a first wafer including the image sensor;
a second wafer including the image signal processor; and
wherein the first wafer and the second wafer are formed in a wafer stack structure.

17. An electronic system comprising:
an image sensor including a pixel array having a plurality of subpixel groups, each of the plurality of subpixel groups including,
a plurality of subpixels, each of the plurality of subpixels being configured to generate a subpixel signal in digital format based on photocharge accumulated in response to at least one photon, and a row driver block configured to generate a first control signal to control operation of the pixel array;

an image signal processor configured to pixelize the subpixel signals according to subpixel group, and to generate image data;

a processor configured to control operation of the image sensor and the image signal processor;

a memory configured to store the image data and commands for controlling the image sensor and the image signal processor;

wherein the first control signal controls the plurality of subpixels in each of the plurality of subpixel groups to accumulate the photocharge in parallel from a first time point to a second time point;

wherein each of the plurality of subpixels includes a detection circuit including a photodiode and a reset switch, and a transfer circuit including a transfer switch and a comparator, the transfer circuit configured to output a plurality of comparison signals based on the accumulated photocharge, and a counter configured to (i) count the plurality of comparison signals, and (ii) output the count value as the subpixel signal;

wherein the transfer switch is connected between the photodiode and an input of the comparator; and wherein a first terminal of the reset switch is connected to a node between the photodiode and the transfer switch, and a second terminal of the reset switch is connected to a voltage source.

18. The electronic system of claim 17, wherein the row driver block is configured to generate a second control signal to control the plurality of subpixels in each of the plurality of subpixel groups to sequentially output the subpixel signals in units of rows after the second time point.

19. An image sensor comprising:

a pixel array including a plurality of subpixel groups, each of the plurality of subpixel groups including a plurality of subpixels, the plurality of subpixels in each subpixel group being configured to, accumulate photocharge concurrently during a first time period, and generate subpixel signals based on the accumulated photocharge;

wherein each of the plurality of subpixels includes a detection circuit including a photodiode and a reset switch, a transfer circuit including a transfer switch and a comparator, the transfer circuit configured to output a plurality of comparison signals based on the accumulated photocharge, and a counter configured to (i) count the plurality of comparison signals, and (ii) output the count value as the subpixel signal;

wherein the transfer switch is connected between the photodiode and an input of the comparator; and wherein a first terminal of the reset switch is connected to a node between the photodiode and the transfer switch, and a second terminal of the reset switch is connected to a voltage source.

20. The image sensor of claim 19, further comprising:

a row driver block configured to control the plurality of subpixels in each subpixel group to accumulate the photocharge concurrently during the first time period.

21. The image sensor of claim 19, wherein the pixel array is further configured to sequentially output the subpixel signals in units of rows of subpixel groups after expiration of the first time period.

22. The image sensor of claim 19, wherein the detection circuit is configured to detect at least one photon, and generate at least one photocharge based on the detected photon; and each of the plurality of subpixels further includes a selection circuit configured to output the subpixel signal.

23. The image sensor of claim 19, further comprising:

a readout circuit configured to store and output the subpixel signals.

24. An image sensor comprising:

a pixel array including a plurality of subpixel groups, each of the plurality of subpixel groups including a plurality of subpixels, the plurality of subpixels in each subpixel group being configured to, accumulate photocharge concurrently during a first time period, and generate a plurality of comparison signals based on the accumulated photocharge and a threshold signal;

a readout circuit configured to, count the plurality of comparison signals corresponding to the photocharge accumulated by each of the plurality of subpixels during the first time period, store the count values, and output the count values as subpixel signals;

wherein each of the plurality of subpixels includes a detection circuit including a photodiode and a reset switch, and a transfer circuit including a transfer switch and a comparator;

wherein the transfer switch is connected between the photodiode and an input of the comparator; and wherein a first terminal of the reset switch is connected to a node between the photodiode and the transfer switch, and a second terminal of the reset switch is connected to a voltage source.

25. The image sensor of claim 24, wherein the detection circuit is configured to detect at least one photon, and generate at least one photocharge based on the detected photon;

the transfer circuit is configured to accumulate the photocharge generated during the first time period, and generate an electrical signal based on the accumulated photocharge; and each of the plurality of subpixels further includes a selection circuit configured to output the electrical signal.

* * * * *